US010794559B2

(12) United States Patent
Masuda et al.

(10) Patent No.: US 10,794,559 B2
(45) Date of Patent: Oct. 6, 2020

(54) VEHICLE LAMP AND VEHICLE HAVING THE SAME (71) Applicant: KOITO MANUFACTURING CO., LTD., Tokyo (JP)

(72) Inventors: Takeshi Masuda, Shizuoka (JP); Takayoshi Ishizuka, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 213 days.

(21) Appl. No.: 15/488,087

(22) Filed: Apr. 14, 2017

(65) Prior Publication Data

US 2017/0299139 A1 Oct. 19, 2017

(30) Foreign Application Priority Data

Apr. 15, 2016 (JP) .................................. 2016-082005

(51) Int. Cl.
*F21S 41/148* (2018.01)
*F21S 41/698* (2018.01)
(Continued)

(52) U.S. Cl.
CPC .......... *F21S 41/148* (2018.01); *B60Q 1/0011* (2013.01); *B60Q 1/04* (2013.01);
(Continued)

(58) Field of Classification Search
CPC ........ F21S 41/65; F21S 41/663; F21S 41/141; F21S 41/148; F21S 41/151; F21S 41/153;
(Continued)

(56) References Cited

U.S. PATENT DOCUMENTS 6,030,099 A * 2/2000 McDermott ............. B60Q 1/08
362/276
8,231,255 B2 * 7/2012 Konishi ................ F21S 41/663
362/538
(Continued)

FOREIGN PATENT DOCUMENTS

EP 2128521 A1 12/2009
EP 2492141 A2 8/2012
(Continued)

OTHER PUBLICATIONS

Office Action in counterpart Chinese Patent Application No. 201710244212.8 dated May 5, 2019 (15 pages).
(Continued)

*Primary Examiner* — Erin Kryukova
(74) *Attorney, Agent, or Firm* — Osha Liang LLP (57) ABSTRACT

A vehicle lamp comprises a light source for road surface drawing configured to emit light becoming a light source image, and a projection lens, which has an optical axis extending in a front and rear direction and the light is to pass therethrough. The vehicle lamp can form a plurality of light distribution patterns on a road surface over a range from a position close to the lamp to a position distant from the lamp by the light emitted from the light source and having passed through the projection lens, and the respective light distribution patterns are to be projected on the road surface at states where relative positions between the projection lens and the light source image are different.

9 Claims, 7 Drawing Sheets (51) Int. Cl.
| F21S 41/43 | (2018.01) |
| F21S 41/255 | (2018.01) |
| F21S 41/663 | (2018.01) |
| F21S 41/63 | (2018.01) |
| F21S 41/275 | (2018.01) |
| F21S 41/151 | (2018.01) |
| F21S 41/32 | (2018.01) |
| B60Q 1/00 | (2006.01) |
| B60Q 1/04 | (2006.01) |
| B60Q 1/08 | (2006.01) |
| F21Y 103/10 | (2016.01) |
| F21S 41/657 | (2018.01) |

(52) U.S. Cl.
CPC ............ *B60Q 1/085* (2013.01); *F21S 41/151* (2018.01); *F21S 41/255* (2018.01); *F21S 41/275* (2018.01); *F21S 41/32* (2018.01); *F21S 41/43* (2018.01); *F21S 41/635* (2018.01); *F21S 41/657* (2018.01); *F21S 41/663* (2018.01); *F21S 41/698* (2018.01); *B60Q 2300/056* (2013.01); *B60Q 2300/45* (2013.01); *F21S 41/321* (2018.01); *F21Y 2103/10* (2016.08)

(58) Field of Classification Search
CPC ...... F21S 41/657; F21S 41/635; F21S 41/265; F21S 43/14; F21S 43/26; F21S 41/698; F21S 41/43; F21S 41/255; F21S 41/275; F21S 41/32; F21S 41/321; F21Y 2103/10; F21Y 2107/50; B60Q 2300/45; B60Q 2300/50; B60Q 1/50; B60Q 1/503; B60Q 1/506; B60Q 1/152; B60Q 1/54; B60Q 1/525; B60Q 2400/50; B60Q 2400/40; B60Q 1/323; B60Q 1/0011; B60Q 1/04; B60Q 1/085; B60Q 2300/056
See application file for complete search history.

(56) References Cited

U.S. PATENT DOCUMENTS

| 9,315,146 | B2* | 4/2016 | Purks | B60Q 1/34 |
| 9,688,188 | B2* | 6/2017 | Son | B60Q 1/50 |
| 2005/0117364 | A1* | 6/2005 | Rennick | B60R 1/1207 362/540 |
| 2006/0023465 | A1* | 2/2006 | Ohshio | F21S 41/689 362/514 |
| 2007/0053195 | A1* | 3/2007 | Alberti | B60Q 1/2665 362/494 |
| 2009/0046474 | A1* | 2/2009 | Sato | B60Q 1/076 362/466 |
| 2011/0170308 | A1 | 7/2011 | Kinoshita et al. | |
| 2013/0010484 | A1* | 1/2013 | Son | B60Q 1/346 362/464 |
| 2013/0215635 | A1* | 8/2013 | Boyd, Jr. | F21S 41/143 362/518 |
| 2014/0029279 | A1* | 1/2014 | Suckling | F21S 41/16 362/510 |
| 2014/0055252 | A1* | 2/2014 | Ascencio | B60Q 1/50 340/425.5 |
| 2014/0092616 | A1* | 4/2014 | Motomura | F21S 43/26 362/511 |
| 2014/0313755 | A1 | 10/2014 | Tanaka | |
| 2016/0161076 | A1* | 6/2016 | Shibata | B60Q 1/143 362/509 |
| 2017/0050555 | A1* | 2/2017 | Chen | B60Q 1/0076 |

FOREIGN PATENT DOCUMENTS

| FR | 2805598 A1 | 8/2001 |
| JP | 2011249183 A | 12/2011 |
| JP | 2012-6482 A | 1/2012 |
| JP | 2012181936 A | 9/2012 |
| JP | 2012255271 A | 12/2012 |
| JP | 2014216049 A | 11/2014 |
| JP | 2014229353 A | 12/2014 |
| JP | 2016030527 A | 3/2016 |

OTHER PUBLICATIONS

Office Action in counterpart Japanese Patent Application No. 2016-082005 dated Dec. 3, 2019, with English Translation (11 pages).

Search Report issued in corresponding French Patent Application No. 1753280 and English Translation of Written Opinion dated Jan. 7, 2020 (9 pages).

Office Action issued in corresponding Japanese Application No. 2016-082005; dated Jun. 23, 2020 (9 pages).

* cited by examiner

VEHICLE LAMP AND VEHICLE HAVING THE SAME

CROSS-REFERENCE TO RELATED APPLICATION

The present application claims the benefit of priority of Japanese Patent Application No. 2016-082005, filed on Apr. 15, 2016, the disclosure of which is incorporated herein by reference.

TECHNICAL FIELD

The disclosure relates to a vehicle lamp and a vehicle having the vehicle lamp.

A Japanese Patent Application Publication No. 2012-006482 discloses a lamp unit having a light source, a rotary shade, a reflector and a projection lens in a housing. The rotary shade can be rotated by a motor driving or the like, and is configured to shade at least a part of light illuminated from the light source by moving a shade plate or a cutout portion for forming a desired light distribution pattern on an optical axis, thereby forming a light distribution pattern for low beam or a light distribution pattern for high beam.

As described above, the rotary shade disclosed in the Japanese Patent Application Publication No. 2012-006482 is provided to form a light distribution pattern for low beam or a light distribution pattern for high beam, and is difficult to form a light distribution pattern (mark) for road surface drawing of which an illumination range is relatively narrow, for example.

Also, a mark for road surface drawing is preferably configured to uniformize clarities (for example, degrees of blurring of outlines) of a near light distribution pattern and a distant light distribution pattern so as to secure favorable visibility.

SUMMARY OF THE INVENTION

It is therefore an object of the disclosure to provide a vehicle lamp capable of uniformizing clarities of a light distribution pattern to be drawn on a road surface in the vicinity of a vehicle and a light distribution pattern to be drawn on a road surface distant from the vehicle, and a vehicle having the vehicle lamp.

The present application provides a vehicle lamp comprises a light source for road surface drawing configured to emit light becoming a light source image, and a projection lens, which has an optical axis extending in a front and rear direction and the light is to pass therethrough, wherein a plurality of light distribution patterns can be formed on a road surface over a range from a position close to the lamp to a position distant from the lamp by the light emitted from the light source and having passed through the projection lens, and wherein the respective light distribution patterns are to be projected on the road surface at states where relative positions between the projection lens and the light source image are different.

The vehicle lamp may form a light distribution pattern, on the road surface in the vicinity of the lamp, that is more defocused than a light distribution pattern, which is formed on the road surface distant from the lamp by the vehicle lamp.

The vehicle lamp may form a plurality of light distribution patterns, which are similar to each other when seeing a road surface ahead of the vehicle from above.

According to this configuration, it is possible to provide the vehicle lamp capable of uniformizing clarities of a light distribution pattern to be drawn on a road surface in the vicinity of a vehicle and a light distribution pattern to be drawn on a road surface distant from the vehicle.

In the vehicle lamp, the relative position between the projection lens and the light source image is a relative position between the projection lens and a light emitting surface of the light source.

According to this configuration, it is possible to obtain a desired light distribution pattern by moving the projection lens or the light source.

In the vehicle lamp, the light source may comprise a plurality of light emitting elements arranged in parallel along a vertical direction and may be configured to be individually turned on and off, and the relative position between the projection lens and the light emitting surface may be able to be changed in correspondence to the lighting and lights-out of each light emitting element.

According to this configuration, it is possible to obtain a plurality of light distribution patterns of which outlines are uniformly clarified by moving the light source unit or the projection lens to cause the defocus, in response to the lighted light emitting element.

In the vehicle lamp, the projection lens may be configured to be rotatable about a rotary shaft extending in a width direction of a vehicle and may be configured to rotate between a position at which a back focal point of the projection lens is arranged in the vicinity of a light emitting surface of the light source and a position at which the back focal point is arranged in front of or at the rear of the light emitting surface.

According to this configuration, it is possible to obtain a plurality of light distribution patterns of which outlines are uniformly clarified by rotating the projection lens to cause the defocus.

The vehicle lamp may further comprises a light shade arranged in the vicinity of a back focal point of the projection lens, the light shade may have at least one opening extending in a width direction of a vehicle or in a direction inclined relative to the width direction of the vehicle, and the light shade may be configured to be rotatable about a rotary shaft extending in the width direction of the vehicle and is configured to rotate between a position at which at the opening is arranged in the vicinity of the back focal point and a position at which the opening is arranged in front of or at the rear of the back focal point.

According to this configuration, it is possible to formalize the clarities of a light distribution pattern to be drawn in the vicinity of the vehicle and a light distribution pattern to be drawn at a position distant from the vehicle by rotating the light shade having the opening.

The present application also provides a vehicle having the vehicle lamp including at least one of the above mentioned features.

According to this configuration, it is possible to improve the safety of the vehicle by mounting the above-described vehicle lamp.

According to the disclosure, it is possible to provide the vehicle lamp capable of uniformizing clarities of the light distribution pattern drawn on the road surface in the vicinity of the vehicle and the light distribution pattern drawn on the road surface distant from the vehicle, and the vehicle having the vehicle lamp.

DETAILED DESCRIPTION

Hereinafter, illustrative embodiments of the disclosure will be described in detail with reference to the drawings.

First Illustrative Embodiment

Figure 1:
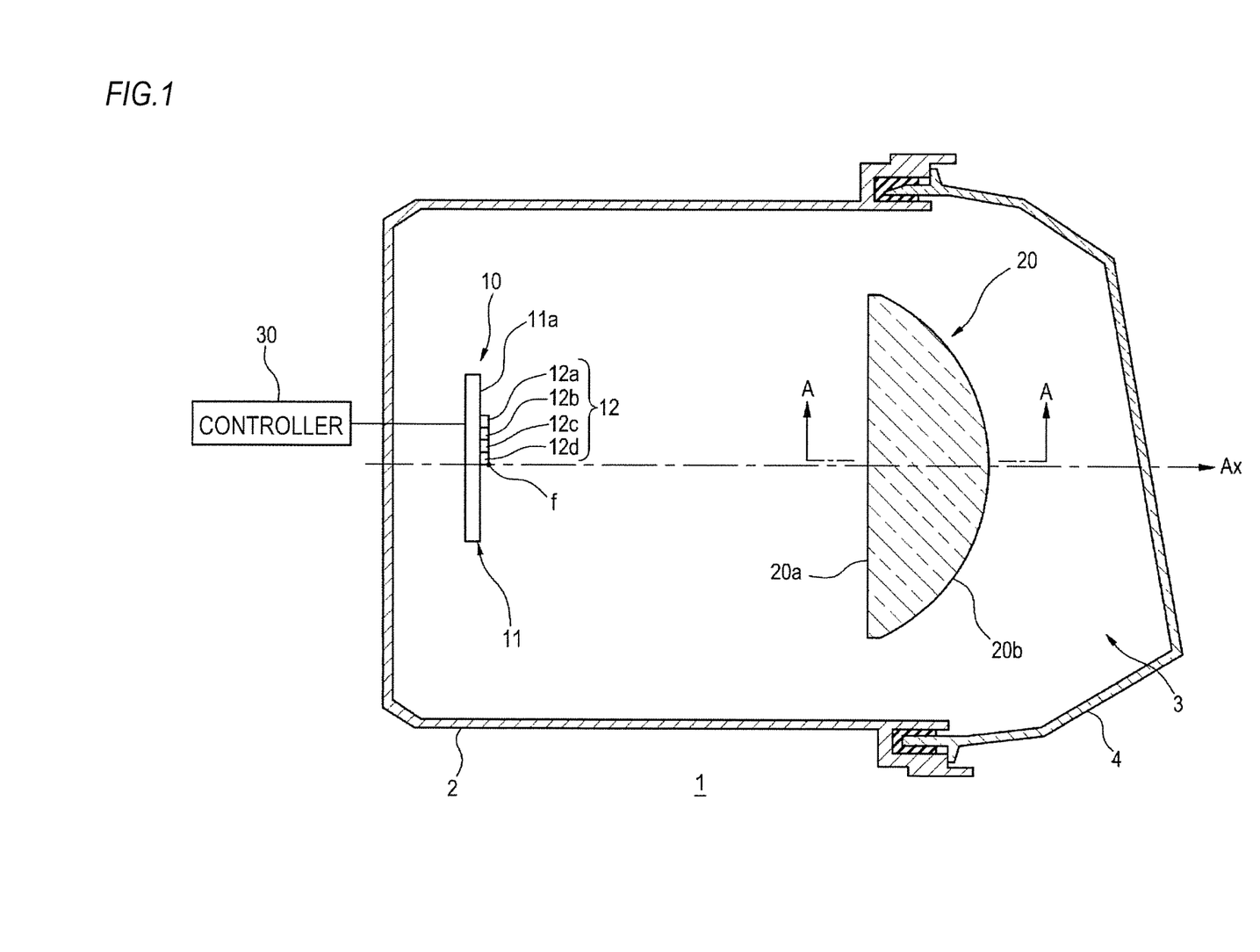
FIG. 1 is a vertically sectional view depicting a schematic structure of a vehicle lamp in accordance with a first illustrative embodiment of the disclosure.
Figure 2:
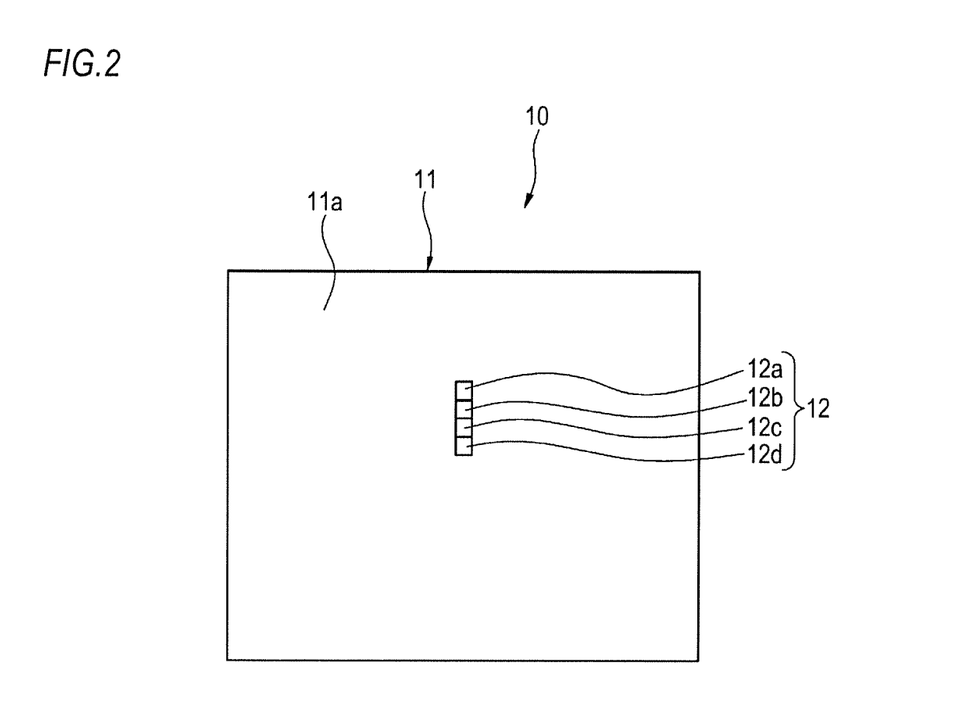
FIG. 2 is a front view of a light source unit of the lamp of the first illustrative embodiment.

FIG. 1 is a vertically sectional view depicting a schematic structure of a vehicle lamp in accordance with a first illustrative embodiment of the disclosure, and FIG. 2 is a front view of a light source unit of the lamp of the first illustrative embodiment.

A vehicle lamp 1 (hereinafter, referred to as 'lamp 1') of the first illustrative embodiment is a lamp unit for road surface drawing (road surface drawing device) mounted to at least one of a pair of headlights arranged at right and left sides of a front of a vehicle. FIG. 1 depicts a structure of the lamp unit for road surface drawing mounted to one headlight, as the vehicle lamp 1.

As shown in FIG. 1, the lamp 1 includes a lamp body 2 having an opening formed at a front side of the vehicle and a transparent cover 4 attached so as to cover the opening of the lamp body 2. The transparent cover 4 is formed of resin, glass or the like having transparency. In a lamp chamber 3 formed by the lamp body 2 and the transparent cover 4, a light source unit 10 and a projection lens 20 are accommodated. The respective constitutional elements are attached to the lamp body 2 by a support mechanism (not shown).

As shown in FIG. 1, the light source unit 10 includes a circuit board 11 and a plurality of LED chips (four LED chips, herein) 12 (12a to 12d) (an example of the light source) closely arranged on a chip mounting surface 11a of the circuit board 11 along an upper and lower direction (vertical direction) of the lamp 1. In the meantime, as the light source, a semiconductor light emitting element other than the LED chip may be used. As shown in FIG. 2, each LED chip 12 has a substantially square-shaped light emitting surface. In the meantime, each LED chip 12 may have a light emitting surface other than the square shape, such as a rectangular shape. A light source image that is to be formed by light from each LED chip 12 preferably has an aspect ratio of 0.5 to 1.5, which is a ratio of a width in the upper and lower direction to a width in a right and left direction, when a width of the vehicle in the right and left direction is set to 1, for example. Also, the respective LED chips 12 can be individually turned on and off, in response to a control signal from a controller 30.

As shown in FIG. 1, the projection lens 20 has an incident surface 20a and a convex output surface 20b. The incident surface 20a is arranged to face the light emitting surfaces of the LED chips 12, and the output surface 20b is arranged to face ahead of the lamp. An optical axis Ax of the projection lens 20 preferably faces towards a direction in which the light having passed through the projection lens 20 is to illuminate a road surface in a predetermined range ahead of the lamp.

Figure 3:
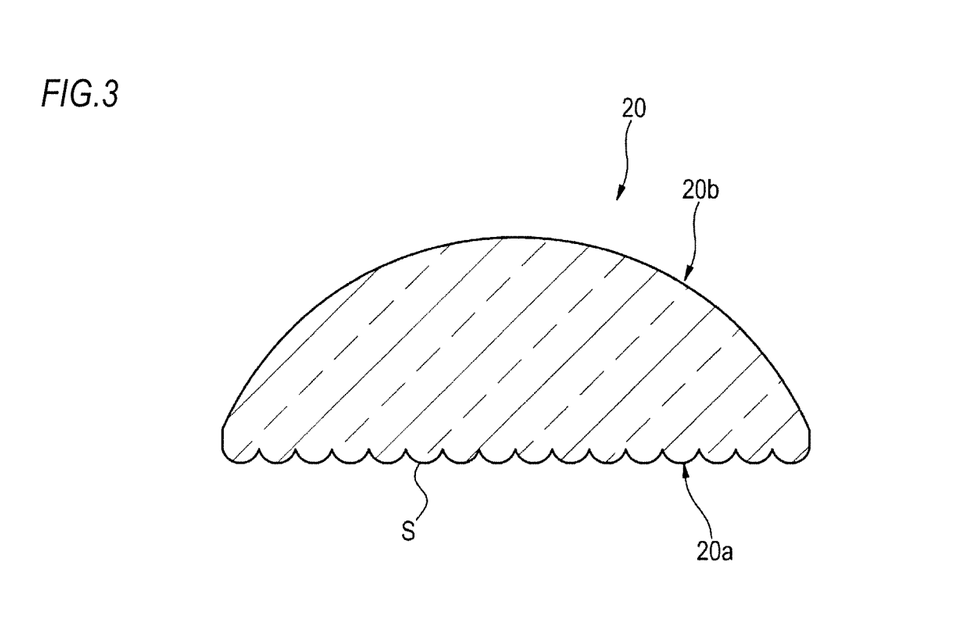
FIG. 3 is a sectional view taken along a line A-A of FIG. 1, depicting a projection lens of the first illustrative embodiment.

As shown in FIG. 3, the incident surface 20a of the projection lens 20 may be formed with a diffusion step S so as to obtain a desired light distribution pattern. For example, in the first illustrative embodiment, the incident surface 20a may be formed with a plurality of cylindrical diffusion steps S arranged in parallel along the right and left direction of the lamp. Thereby, it is possible to diffuse the light, which is to be incident on the projection lens 20, in the right and left direction. The diffusion step S is not limited to the cylindrical shape and may be a step having a shape of which tangential lines are continuous (an unevenness shape having tangent continuity) or a step having a shape of which curvatures are continuous (an unevenness shape having curvature continuity). Also, the diffusion step is not limited to the curved surface and may have a triangular shape or the like, for example.

The projection lens 20 is attached to the lamp body 2 so that it can freely move in a front and rear direction of the lamp within a predetermined range by a moving mechanism (not shown). Thereby, the projection lens 20 can move relative to the light source unit 10 in the front and rear direction along the optical axis Ax (refer to FIGS. 4A to 4D). In the meantime, instead of the configuration of moving the projection lens 20 or in addition to the configuration, a configuration of freely moving the light source unit 10 along the front and rear direction of the lamp can be adopted.

The lighting and lights-out of the respective LED chips 12a to 12d, emission intensity adjustment of the lights from the respective LED chips 12a to 12d, blinking rate adjustment of the LED chips and moving control of the projection lens 20 are performed by the controller 30. The controller 30 is implemented by a device and a circuit such as a CPU of a computer, a storage unit and the like, as a hardware configuration, and is implemented by a computer program or the like, as a software configuration. In the meantime, the controller 30 is provided outside the lamp chamber 3, as shown in FIG. 1. However, the controller 30 may be provided inside the lamp chamber 3. The controller 30 is configured to receive signals from a lamp switch and the like (not shown) and to transmit a variety of controls signals to the respective LED chips 12a to 12d, in response to the received signals. Also, the controller 30 is configured to determine a lighting sequence of the LED chips 12 and to control the moving of the projection lens 20 in accordance with the determined lighting sequence.

Figure 4A:
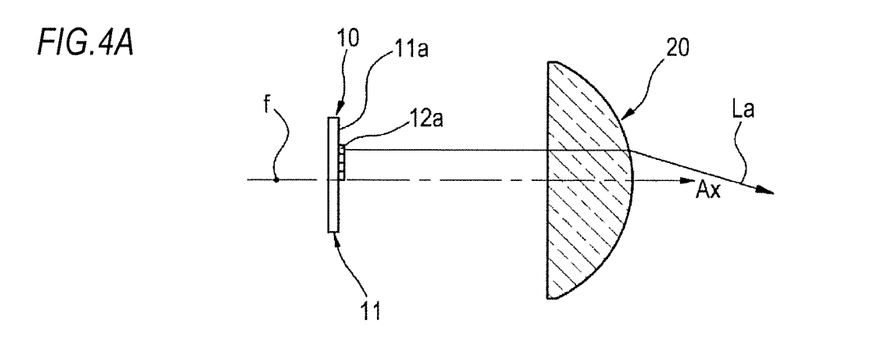
FIGS. 4A to 4D depict states where the projection lens of the first illustrative embodiment has been moved in a front and rear direction.
Figure 4B:
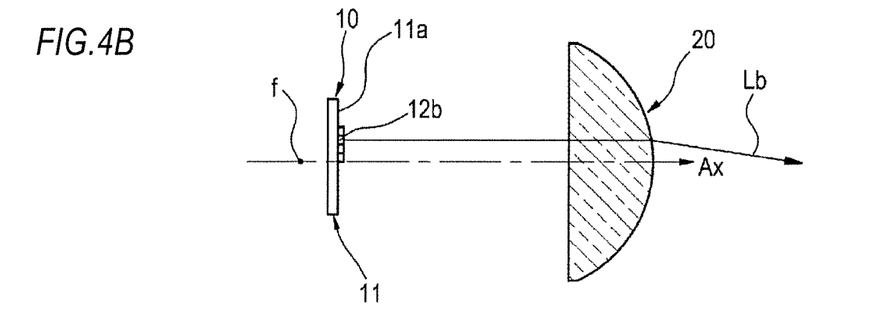
Figure 4C:
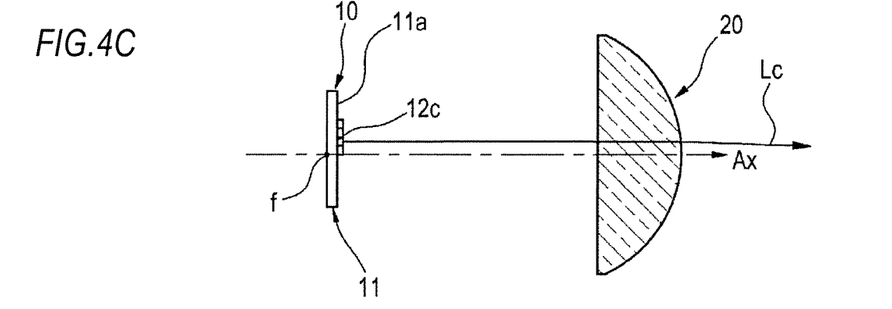
Figure 4D:
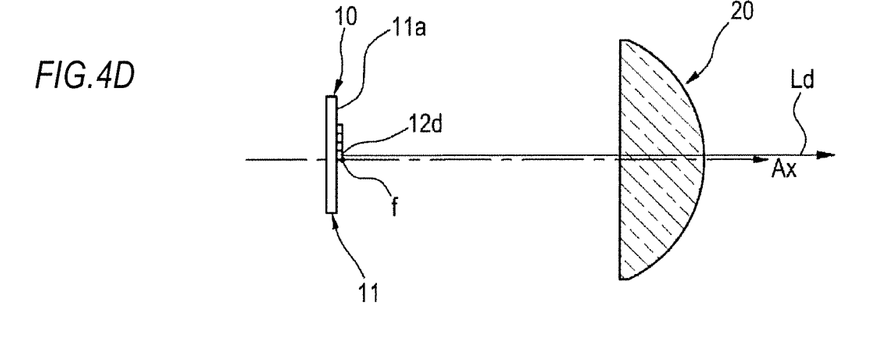

As described above, the controller 30 is configured to move the projection lens 20 along the front and rear direction of the lamp, in correspondence to the lighting of the respective LED chips 12a to 12d. Specifically, when turning on the uppermost LED chip 12a, the projection lens 20 is arranged at the closest position to the light source unit 10 within a moving range thereof, as shown in FIG. 4A. At this time, the light emitting surface of the LED chip 12*a* is positioned in front of a back focal point f of the projection lens 20. At this state, when the LED chip 12*a* is turned on, the light La emitted from the LED chip 12*a* and passing through the projection lens 20 is diffused in the right and left direction by the diffusion step S formed on the incident surface 20*a* of the projection lens 20 and is projected on a road surface in the vicinity of the lamp. Subsequently, when turning on the second LED chip 12*b* from the top, the projection lens 20 is moved along the optical axis Ax so that it gets further away from the light source unit 10 than the position of FIG. 4A, as shown in FIG. 4B. At this state, the light Lb emitted from the LED chip 12*b* and passing through the projection lens 20 is diffused in the right and left direction by the diffusion step S formed on the incident surface 20*a* of the projection lens 20 and is projected on a road surface further away from the vehicle than the light La from the LED chip 12*a*. Subsequently, when turning on the third LED chip 12*c* from the top, the projection lens 20 is moved along the optical axis Ax so that it gets further away from the light source unit 10 than the position of FIG. 4B, as shown in FIG. 4C. At this state, the light Lc emitted from the LED chip 12*c* and passing through the projection lens 20 is diffused in the right and left direction by the diffusion step S formed on the incident surface 20*a* of the projection lens 20 and is projected on a road surface further away from the vehicle than the light Lb from the LED chip 12*b*. Finally, when turning on the lowermost LED chip 12*d*, the projection lens 20 is moved along the optical axis Ax so that it gets further away from the light source unit 10 than the position of FIG. 4C, as shown in FIG. 4D. At this time, the light emitting surface of the LED chip 12*d* is positioned at a position that is substantially the same as the back focal point f of the projection lens 20. At this state, the light Ld emitted from the LED chip 12*d* and passing through the projection lens 20 is diffused in the right and left direction by the diffusion step S formed on the incident surface 20*a* of the projection lens 20 and is projected on a road surface further away from the vehicle than the light Lc from the LED chip 12*c*.

In this way, at the states shown in FIGS. 4A to 4C (the lighting states of the LED chips 12*a* to 12*c*), the LED chip 12 is arranged in front of the back focal point f of the projection lens 20. That is, when the projection lens 20 is moved closely to the light source unit 10 from the state of FIG. 4D, the light emitting surface of the LED chip 12 (12*d*) deviates in the direction of the optical axis Ax from the back focal point f of the projection lens 20 (defocused).

Figure 5:
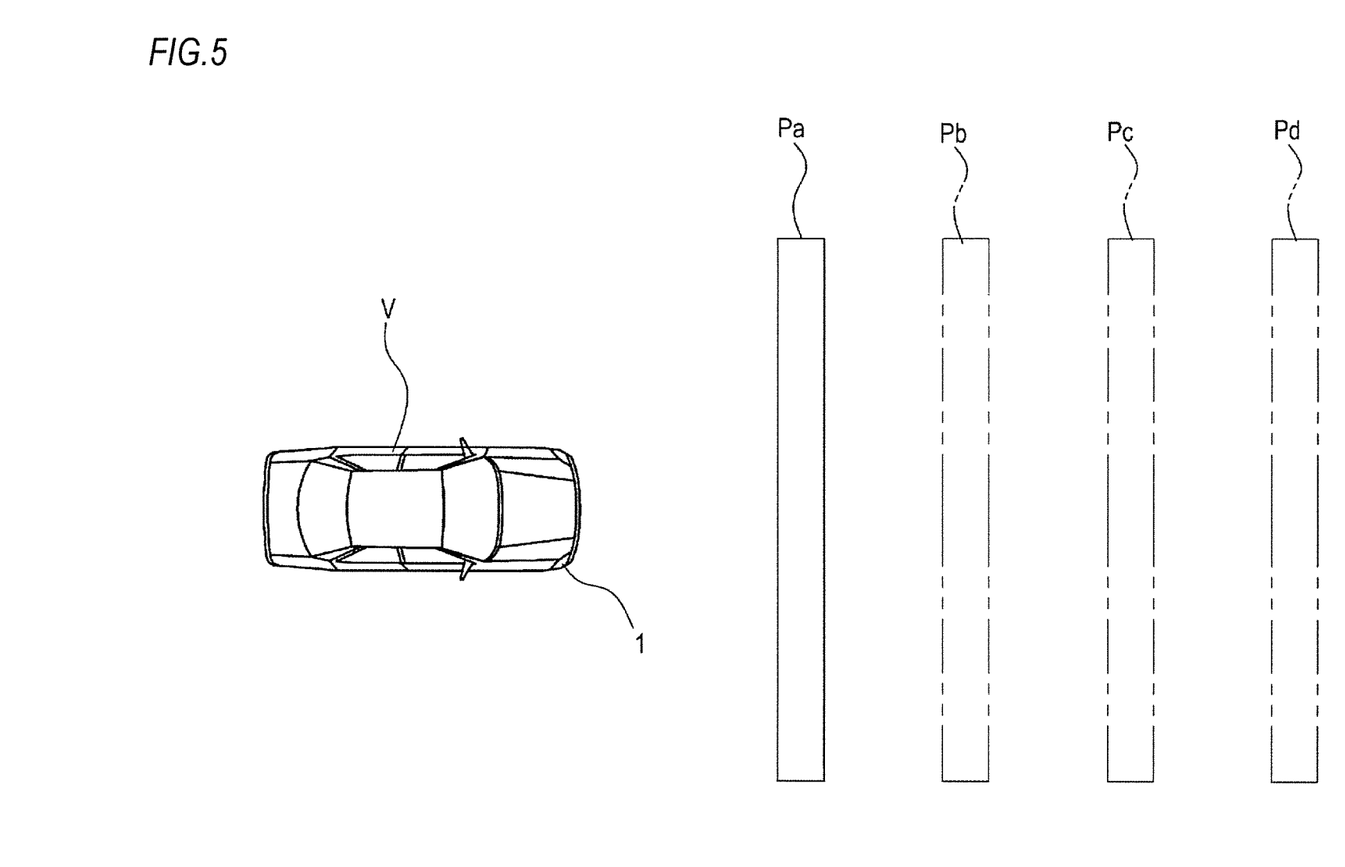
FIG. 5 depicts an example of a light distribution pattern that is to be formed by the lamp of the first illustrative embodiment.

FIG. 5 depicts an example of a light distribution pattern that is to be formed by the light illuminated from the lamp 1.

As shown in FIG. 5, the light La emitted from the LED chip 12*a* passes through the projection lens 20, thereby drawing, on the road surface, a horizontally long linear light distribution pattern Pa further extending in the right and left direction than in the front and rear direction. Likewise, the respective lights Lb to Ld emitted from the LED chips 12*b* to 12*d* draw linear light distribution patterns Pb to Pd on the road surface, respectively. As described above, since the LED chips 12*a* to 12*d* are arranged in parallel along the upper and lower direction of the lamp 1, the plurality of linear light distribution patterns Pa to Pd formed by the emission lights of the respective LED chips 12*a* to 12*d* is drawn at different positions on the road surface over a range from a position close to the vehicle to a position distant from the vehicle. In the first illustrative embodiment, the controller 30 first moves the projection lens 20 to a position corresponding to the uppermost LED chip 12*a* and turns on the LED chip 12*a* at that state, thereby drawing the linear light distribution pattern Pa on the road surface closest to the vehicle. Subsequently, the controller 30 moves the projection lens 20 to a position corresponding to the LED chip 12*b* and turns on the LED chip 12*b* at that state, thereby drawing the linear light distribution pattern Pb on the road surface further away from the linear light distribution pattern Pa. In this way, when the LED chips 12*a* to 12*d* are sequentially turned on and off while moving the projection lens 20, it is possible to sequentially form the plurality of linear light distribution patterns Pa to Pd, which are similar to each other when seeing the road surface ahead of the vehicle from above, as shown in FIG. 5. In the meantime, the forming sequence of the linear light distribution patterns Pa to Pd is not limited to the above. For example, one of the plurality of LED chips 12*a* to 12*d* may be turned on, in correspondence to a position of a pedestrian ahead of the vehicle. In this case, the controller 30 is configured to determine a specific LED chip that should be turned on, to move the projection lens 20 to a position corresponding to the determined specific LED chip and to turn on the specific LED chip, thereby drawing a linear light distribution pattern at a desired position on the road surface.

In the meantime, each of the linear light distribution patterns Pa to Pd has an aspect ratio of 5 or greater, which is a ratio of a width in the right and left direction to a width in the front and rear direction, when a width of the vehicle in the front and rear direction is set to 1, for example. Regarding the aspect ratios of the linear light distribution patterns Pa to Pd, the aspect ratio of the width in the right and left direction to the width in the front and rear direction is particularly preferably 1:10 or greater. When a vertically longer linear light distribution pattern having an aspect ratio greater than the above-exemplified aspect ratio is required, it is possible to cope with the requirement by increasing the vertical/horizontal aspect ratio of each LED chip 12 or changing a magnification of the light source image of the projection lens 20.

As described above, the lamp 1 of the first illustrative embodiment includes the LED chips 12*a* to 12*d* for road surface drawing configured to emit the lights La to Ld becoming the light source images, and the projection lens 20, which has the optical axis Ax extending in the front and rear direction and the respective lights La to Ld are to pass therethrough. Also, the lamp 1 can form the plurality of light distribution patterns Pa to Pd over the range from a position close to the lamp to a position distant from the lamp by the respective lights La to Ld emitted from the respective LED chips 12*a* to 12*d* and having passed through the projection lens 20, and is configured so that the respective light distribution patterns Pa to Pd are to be projected on the road surface at the states where the relative positions between the projection lens 20 and the light source unit 10 are different.

In general, when it is intended to emit lights from a plurality of light sources arranged in parallel in the upper and lower direction in the vicinity of a focus position of a projection lens and to draw a plurality of horizontally long linear light distribution patterns on a road surface over a range from a position close to the vehicle to a position distant from the vehicle, an outline of a linear light distribution pattern distant from the vehicle is more blurred than an outline of a linear light distribution pattern close to the vehicle.

In contrast, according to the first illustrative embodiment, the projection lens 20 is moved away from the light source unit 10, as the position of the LED chips 12*a* to 12*d* to be turned on is changed from the top towards the bottom. That is, the relative position between the light source unit 10 and the projection lens 20 is changed so that a linear light distribution pattern close to the vehicle (for example, the linear light distribution pattern Pa) is more defocused than a linear light distribution pattern distant from the vehicle (for example, the linear light distribution pattern Pd). For this reason, it is possible to uniformize clarities (for example, degrees of blurring of outlines) of shapes of the linear light distribution pattern, which is to be drawn on the road surface in the vicinity of the vehicle, and the linear light distribution pattern, which is to be drawn on the road surface distant from the vehicle.

In the meantime, as the light source, a light source bulb can also be used, in addition to the LED chip 12. The light source bulb is configured by an incandescent lamp having a filament, such as a halogen lamp, and has a cup-shaped reflector having an insertion hole, which is provided at a center thereof and a halogen lamp is to be inserted therein. In the meantime, as the light source bulb, the other light source such as a discharge lamp can also be adopted.

Second Illustrative Embodiment

Figure 6:
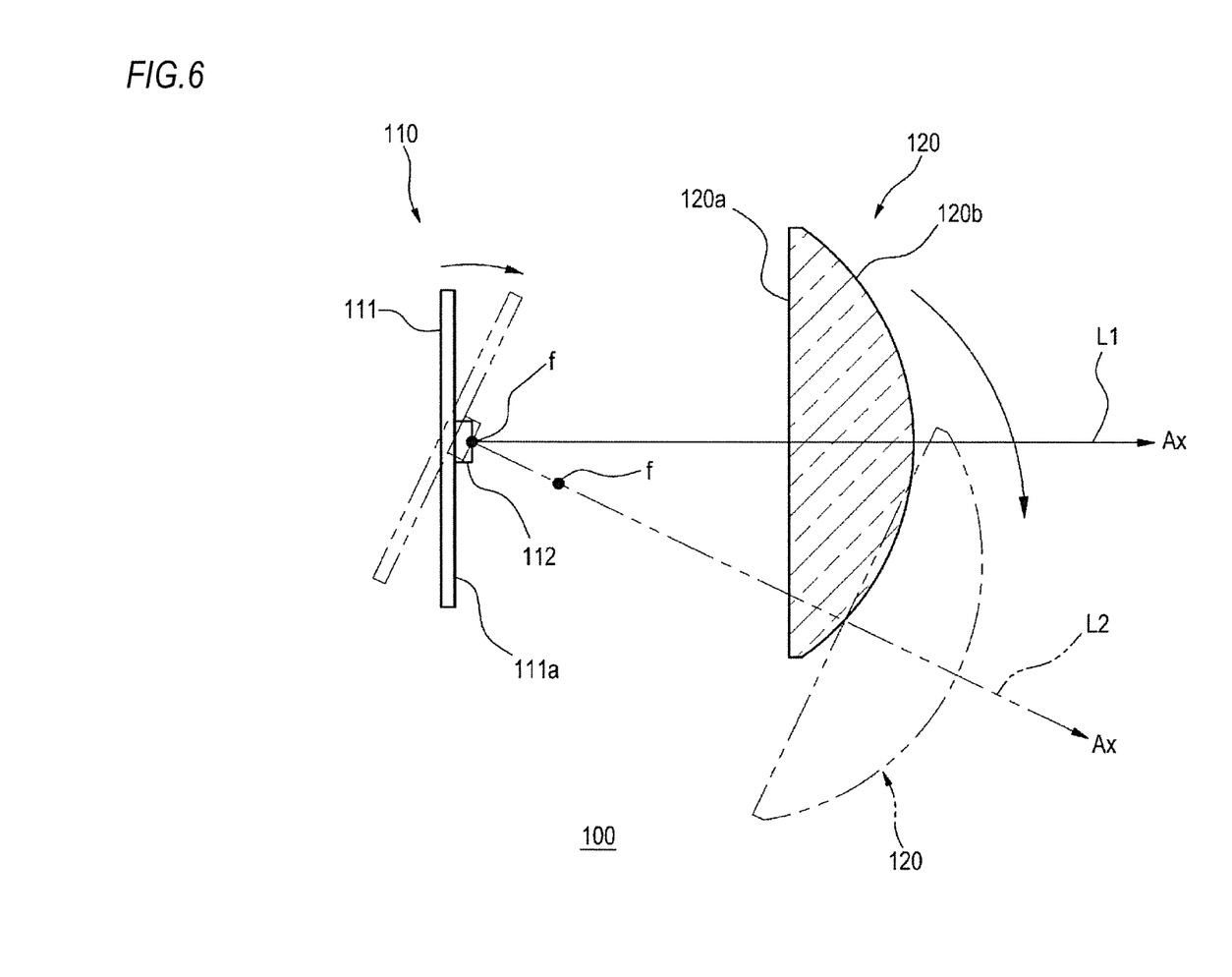
FIG. 6 is a vertically sectional view depicting a vehicle lamp in accordance with a second illustrative embodiment of the disclosure.

FIG. 6 is a vertically sectional view depicting a vehicle lamp for road surface drawing in accordance with a second illustrative embodiment.

A lamp 100 of the second illustrative embodiment includes a light source unit 110 and a projection lens 120. Since the configuration of the projection lens 120 is the same as that of the projection lens 20 of the first illustrative embodiment, the detailed description thereof is omitted.

The light source unit 110 includes a circuit board 111 and at least one LED chip 112 mounted on the circuit board 111. The circuit board 111 is arranged so that a chip mounting surface 111a faces an incident surface 120a of the projection lens 120. The light source unit 110 is supported to a rotation mechanism (not shown) and can be rotated so that a light emitting surface of the LED chip 112 faces obliquely downwards (a direction of the light source unit 110 shown with a broken line in FIG. 6) from a state where it faces ahead of the lamp, as shown in FIG. 6. Also, the projection lens 120 is supported to a rotation mechanism (not shown) (for example, a rotation mechanism having a central axis of rotation extending in a width direction of the vehicle), and can be rotated so that an output surface 120b faces obliquely downwards (a direction of the projection lens 120 shown with a broken line in FIG. 6) ahead of the lamp from a state where it faces ahead of the lamp, in association with the rotation of the light source unit 110. At this time, the projection lens 120 is rotated along a locus in which the projection lens is moved in the front and rear direction along the optical axis Ax so that the light emitting surface of the LED chip 112 is defocused with respect to a focus position f of the projection lens 120. That is, as shown with the solid line in FIG. 6, at a state where the light emitting surface of the LED chip 112 and the projection lens 120 face ahead of the lamp, the relative position between the light source unit 110 and the projection lens 120 is set so that the light emitting surface of the LED chip 112 substantially coincides with the back focal point f of the projection lens. On the other hand, as shown with the broken line in FIG. 6, at a state where the light emitting surface of the LED chip 112 and the projection lens 120 face obliquely downwards, the relative position between the light source unit 110 and the projection lens 120 is set so that the light emitting surface of the LED chip 112 is positioned at the rear of the back focal point f of the projection lens. That is, the projection lens 120 is configured to rotate between a position at which the back focal point f is arranged in the vicinity of the light emitting surface of the LED chip 112 and a position at which the back focal point f is arranged in front of the light emitting surface of the LED chip 112.

In the lamp 100, the light L1 emitted from the LED chip 112 at the state where the light emitting surface of the LED chip 112 and the projection lens 120 face ahead of the lamp passes through the projection lens 120 and is then illuminated on the road surface at a distant position ahead of the vehicle. On the other hand, the light L2 emitted from the LED chip 112 at the state where the light emitting surface of the LED chip 112 and the projection lens 120 face obliquely downwards passes through the projection lens 120 and is then illuminated on the road surface at a close position in front of the vehicle. At this time, at the state where the light emitting surface of the LED chip 112 and the projection lens 120 face obliquely downwards, the light emitting surface of the LED chip 112 is positioned at the rear of the back focal point f of the projection lens. For this reason, a light distribution pattern that is to be drawn on the road surface in the vicinity of the vehicle at this state becomes a light distribution pattern that is more defocused than a light distribution pattern, which is to be drawn on the road surface distant from the vehicle at the state where the back focal point f of the projection lens 120 and the light emitting surface of the LED chip 112 substantially coincide with each other. Therefore, also in the second illustrative embodiment, like the first illustrative embodiment, it is possible to uniformize clarities of the outlines of the light distribution pattern in the vicinity of vehicle and the light distribution pattern distant from the vehicle.

Meanwhile, in the second illustrative embodiment, the projection lens 120 is configured to rotate between the position at which the back focal point f is arranged in the vicinity of the light emitting surface of the LED chip 112 and the position at which the back focal point f is arranged in front of the light emitting surface of the LED chip 112. However, the disclosure is not limited thereto. For example, at the state where the light emitting surface of the LED chip 112 and the projection lens 120 face obliquely downwards, the projection lens 120 may be configured to rotate so that the back focal point f is positioned at the rear of the light emitting surface of the LED chip 112.

Third Illustrative Embodiment

Figure 7:
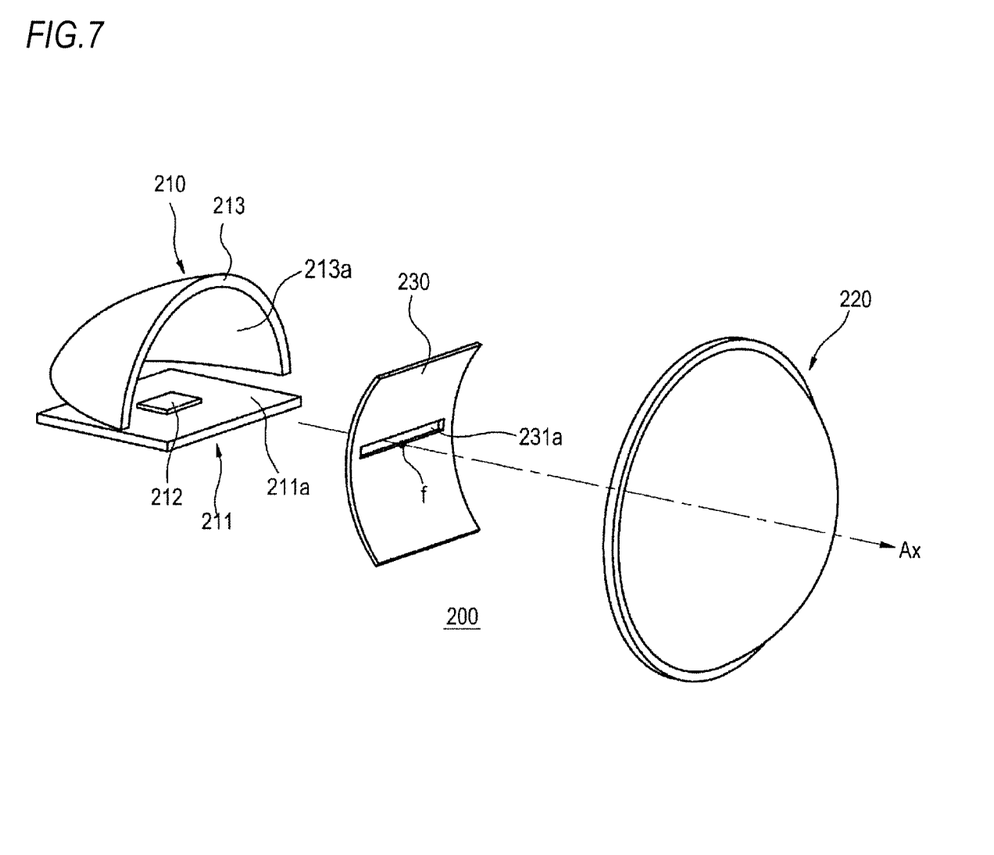
FIG. 7 is a perspective view depicting a schematic structure of a vehicle lamp in accordance with a third illustrative embodiment of the disclosure.
Figure 8A:
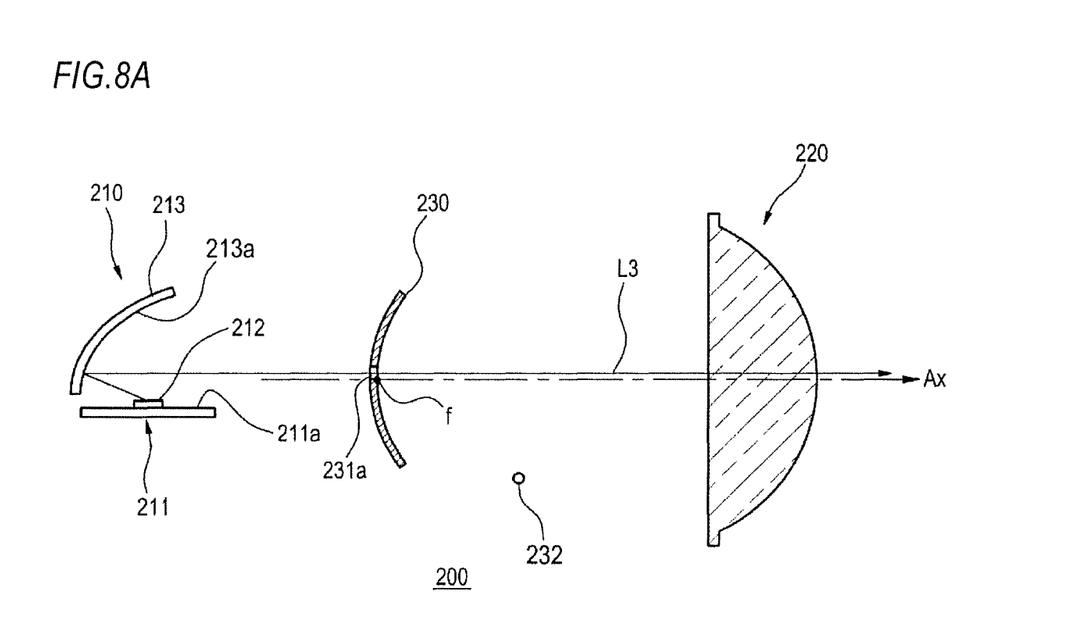
FIGS. 8A and 8B are vertically sectional views depicting a partial configuration of the lamp of the third illustrative embodiment.
Figure 8B:
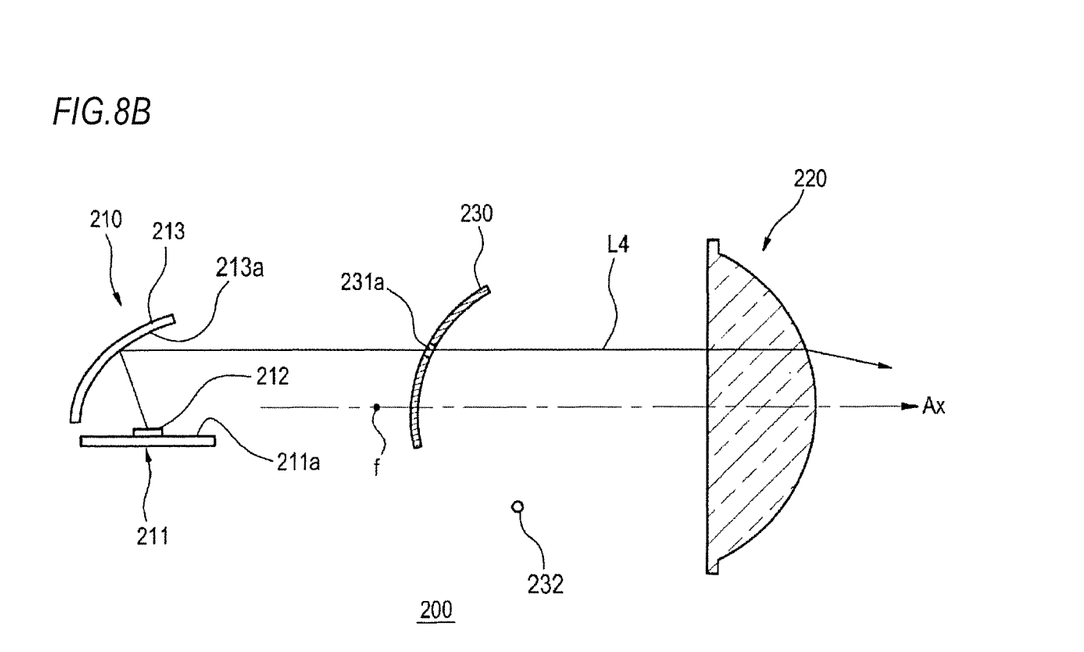

FIG. 7 is a perspective view depicting a schematic structure of a vehicle lamp in accordance with a third illustrative embodiment. Also, FIGS. 8A and 8B depict moving states of a moveable shade in accordance with the third illustrative embodiment.

A lamp 200 of the third illustrative embodiment is a lamp unit for road surface drawing (road surface drawing device) mounted to at least one of a pair of headlights arranged at right and left sides of a front of a vehicle. FIG. 7 depicts a structure of the lamp unit for road surface drawing mounted to one headlight, as the lamp 200, and the lamp body and the transparent cover are not shown.

As shown in FIG. 7, the lamp 200 includes a light source unit 210, a projection lens 220 and a moveable shade 230 (an example of the light shade). The respective constitutional elements are attached to the lamp body by a support mechanism (not shown). Since the configuration of the projection lens 220 is the same as that of the projection lens 20 of the first illustrative embodiment, the detailed description thereof is omitted.

The light source unit 210 includes a circuit board 211, at least one LED chip 212 mounted on the circuit board 211, and a reflector 213. The circuit board 211 is arranged so that a chip mounting surface 211a is substantially parallel with the optical axis Ax of the projection lens 220. The reflector 213 is arranged above the circuit board 211, and has a reflecting surface 213a for reflecting light emitted from the LED chip 212 towards the projection lens 220. The reflecting surface 213a is preferably configured as a free curved surface based on a parabola, so as to reflect the light emitted from the LED chip 212 as parallel light.

As shown in FIGS. 7 and 8A, the moveable shade 230 is arranged in the vicinity of the back focal point f of the projection lens 220 and is configured as a cylindrical member or a member consisting of a part of a cylinder. The moveable shade 230 is formed with a single opening 231a extending in the right and left direction of the lamp. In the meantime, the opening 231a may be formed to extend in a direction inclined relative to the right and left direction of the lamp. As shown in FIGS. 8A and 8B, the moveable shade 230 has a rotary shaft 232 extending in the right and left direction of the lamp (the width direction of the vehicle) at a position deviating from the optical axis Ax of the projection lens 20 at a front side of the lamp, for example, at a position below the optical axis Ax, and is configured to be freely rotatable about the rotary shaft 232.

In the lamp 200, the light emitted from the LED chip 212 and reflected on the reflecting surface 213a of the reflector 213 is partially shaded by the moveable shade 230, and only the light having passed through the opening 231a is incident on the projection lens 220 and passes through the projection lens 220, as a horizontally long light source image further extending in the right and left direction than in the upper and lower direction. Thereby, it is possible to draw a linear light distribution pattern (refer to FIG. 5) further extending in the right and left direction than in the upper and lower direction on the road surface ahead of the vehicle.

FIG. 8A depicts a state where the opening 231a of the moveable shade 230 is arranged at a position at which it substantially coincides with the back focal point f of the projection lens 220. At this time, when the LED chip 212 of the light source unit 210 is turned on, the light L3 reflected on the reflector 213 and having passed through the opening 231a of the moveable shade 230 passes through the projection lens 220 and is then illuminated on the road surface at a distant position ahead of the lamp. In contrast, FIG. 8B depicts a state where the moveable shade 230 is rotated upwards about the rotary shaft 232 from the state shown in FIG. 8A. At this state, the opening 231a of the moveable shade 230 is positioned in front of the back focal point f of the projection lens 220. At this time, when the LED chip 212 of the light source unit 210 is turned on, the light L4 reflected on the reflector 213 and having passed through the opening 231a of the moveable shade 230 passes through the projection lens 220 and is then illuminated on the road surface at a position closer to the vehicle than the light L3 of FIG. 8A.

In this way, when the moveable shade 230 is moved so that the opening 231a is positioned in front of the back focal point f as the position of the opening 231a faces upwards, a light distribution pattern that is to be drawn on the road surface in the vicinity of the vehicle becomes a light distribution pattern that is more defocused than a light distribution pattern, which is to be drawn on the road surface distant from the vehicle. That is, in the third illustrative embodiment, when the moveable shade 230 having the opening 231a is rotated about the rotary shaft 232 provided at the position deviating from the optical axis Ax of the projection lens 20, the linear light distribution pattern close to the vehicle and the linear light distribution pattern distant from the vehicle are formed at the states where the relative positions between the opening 231a of the moveable shade 230 and the projection lens 220 are different. For this reason, according to the third illustrative embodiment, like the first illustrative embodiment, it is possible to uniformize clarities of the outlines of the light distribution pattern, which is to be drawn on the road surface in the vicinity of vehicle, and the light distribution pattern, which is to be drawn on the road surface distant from the vehicle.

Meanwhile, in the third illustrative embodiment, the moveable shade 230 is configured as a part of the cylinder. However, the moveable shade may be configured by a flat plate-shaped member. Also, in the third illustrative embodiment, the reflection-type light source unit 210 having the reflector 213 is adopted. However, like the second illustrative embodiment, a rectangular light source unit having no reflector and arranged so that the light emitting surface of the LED chip is to face the incident surface of the projection lens may also be adopted.

Also, in the third illustrative embodiment, the moveable shade 230 is moved so that the opening 231a is positioned in front of the back focal point f as the position of the opening 231a faces upwards. However, the disclosure is not limited thereto. For example, the moveable shade 230 may be rotated so that the opening 231a is positioned at the rear of the back focal point f as the position of the opening 231a faces upwards.

Although the illustrative embodiments of the disclosure have been described, the disclosure is not limited to the illustrative embodiments and can adopt other configurations, as necessary.

The invention claimed is:

1. A vehicle lamp comprising:
   a light source configured to emit light that forms first and second light distribution patterns on a road surface; and
   a projection lens having an optical axis extending in a front and rear direction and through which the light from the light source passes,
   wherein the light source and the projection lens are adjustable between a first configuration having a first distance between the light source and the projection lens, and a second configuration having a second distance between the light source and the projection lens,
   wherein the first distance and the second distance are different,
   wherein the light source and the projection lens form the first light distribution pattern on the road surface at a first position in the first configuration,
   wherein the light source and the projection lens form the second light distribution pattern on the road surface at a second position in the second configuration,
   wherein the first light distribution pattern is closer to the vehicle lamp than the second light distribution pattern,
   wherein the first light distribution pattern is more defocused than the second light distribution pattern in the second configuration,
   wherein the first distance is less than the second distance,
   wherein the light source comprises first and second light emitting elements arranged in parallel along a vertical direction that are configured to be individually turned on and off, and wherein the first light emitting element is turned on and the second light emitting element is turned off in the first configuration, and the first light emitting element is turned off and the second light emitting element is turned on in the second configuration.

2. The vehicle lamp according to claim 1, wherein the first and second light distribution patterns are substantially identical in size and shape when the road surface is viewed from above.

3. A vehicle having the vehicle lamp according to claim 1.

4. The vehicle lamp according to claim 1,
wherein in the first configuration, a rear focus of the projection lens is disposed behind the light source, and
wherein in the second configuration, the rear focus of the projection lens is disposed on the light source.

5. The vehicle lamp according to claim 1, wherein the first and second light distribution patterns do not overlap on the road surface.

6. The vehicle lamp according to claim 1, wherein the lens is movable between the first configuration and the second configuration.

7. The vehicle lamp according to claim 1, wherein aspect ratios of the first light distribution pattern and the second light distribution pattern are substantially identical.

8. The vehicle lamp according to claim 1, further comprising a controller programmed to adjust the light source and the projection lens to the first configuration when the first light distribution pattern is being formed, and to the second configuration when the second light distribution is being formed.

9. The vehicle lamp according to claim 1, wherein the first light emitting element is disposed above the second light emitting element.

* * * * *